Figure 1:
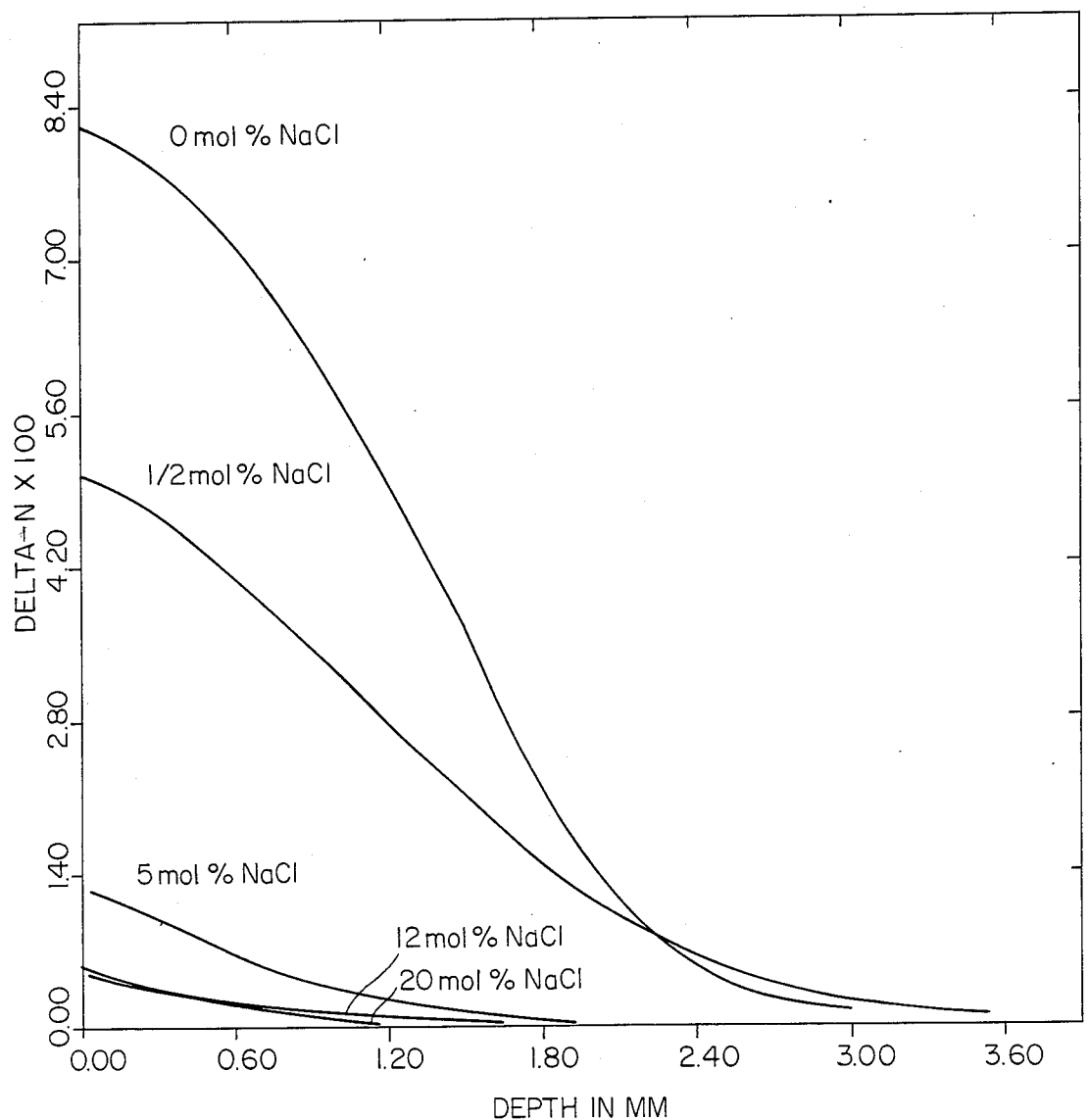

United States Patent [19]

Houde-Walter et al.

[11] Patent Number: 4,756,733
[45] Date of Patent: Jul. 12, 1988

[54] METHOD AND COMPOSITION FOR CREATING GRADIENT-INDEX GLASS

[75] Inventors: Susan Houde-Walter; Duncan Moore, both of Rochester, N.Y.

[73] Assignee: The University of Rochester, Rochester, N.Y.

[21] Appl. No.: 851,175

[22] Filed: Apr. 14, 1986

[51] Int. Cl.[4] ............................................. C03C 21/00
[52] U.S. Cl. .................................... 65/30.13; 65/3.14
[58] Field of Search ............................. 65/30.13, 3.14

[56] References Cited

U.S. PATENT DOCUMENTS 3,542,535 11/1970 Hensler .......................... 65/30.13 X
3,873,408 3/1975 Hensler .......................... 65/30.13 X

FOREIGN PATENT DOCUMENTS 2064408 7/1971 Fed. Rep. of Germany ....... 65/3.14
887499 12/1981 U.S.S.R. ............................... 65/3.14

OTHER PUBLICATIONS

Neuman, V. et al.; Conference: Electro–Optics/Laser International, 1980, UK, Brighton, England, (25–27, 3/1980), pp. 19–30.

Primary Examiner—Kenneth M. Schor
Attorney, Agent, or Firm—Martin LuKacher

[57] ABSTRACT

Disclosed is an ion exchange process and composition useful therein for creating a gradient-index profile in a glass structure which uses a monovalent metal salt bath modified by the addition of a non-monovalent metal salt which provides for complexing of the outdiffusing cation (of the ion exchange process) to prevent poisoning via that cation.

20 Claims, 2 Drawing Sheets

METHOD AND COMPOSITION FOR CREATING GRADIENT-INDEX GLASS

DESCRIPTION

This invention relates to a method for providing a glass body having a gradient-index and to a composition useful therein. More particularly, it relates to a novel ion exchange process for introducing a gradient-index profile into a glass body by using a monovalent metal salt bath modified by the addition of a non-monovalent metal salt. This results in a reduction of the amount of monovalent salt needed to form the bath.

In gradient-index glass, the index of refraction changes across the glass body. Such gradient-index glass is in great demand for use as lenses for fiberoptic devices, photocopy equipment and other optical devices. Several methods are known for the making of gradient-index glass. These methods include ion exchange in glass, "molecular stuffing" of porous glass and phase separation and partial leaching. These methods have been reviewed by Mukherjee in *Gradient Index Lens Fabrication Process: A Review*, in Topical Meeting on Gradient Index Optical Imaging Systems, Optical Society of America (1981).

Ion exchange in glass is a process by which monovalent cations within the glass are exchanged with cations in an external salt bath. The rate of distribution may be increased by applying a voltage across the structure ("field-assisted ion exchange"). A gradient-index profile develops as the distribution of ions changes witnin the structure.

Structures useful in ion exchange may include cylinders wherein the entire structure is immersed in a salt bath and the index changes in a radial fashion. For a gradient-index lens of positive power, tne hignest index, n, is centrally located and decreasing as the perimeter is approached; thus obtaining a gradient index or delta-n in the structure. Such structures also may be planar where one face of the plane is preferentially exposed to the salt bath resulting in a gradient index which is perpendicular to said plane.

The distribution of ions witnin any particular structure may occur over a range of depths from the glass-/bath interface. In some instances, a large change in the distribution of ions may occur over a short depth. This necessarily will limit the overall useful size of the glass. In other instances, a small change in the distribution may occur over a greater depth. This will raise the useful size of the glass without improving the overall profile.

In order to obtain glass wherein the change in the distribution of ions (or "delta-n") is high (e.g., 0.09) and/or where the depth of diffusion is substantial (e.g., >2.0 mm), typically, pure salt baths are required. A major drawback to the production of such gradient-index glass is that the out-diffusing cation, typically sodium, potassium, lithium or sometimes thallium, may adversely affect the purity of the salt bath at the glass-/bath interface thereby reducing the size of the delta-n and/or depth of diffusion achievable. Salt baths thought to be "poisoned" by tne out-diffusing cation include $AgCl$, $LiBr$, $LiNO_3$, $KNO_3$ and $RbCl$.

To counteract such poisoning requires a large salt bath, an essentially unlimited amount of the monovalent metal salt and/or intensive stirring. A polished glass surface also is preferable. In addition, the salt bath typically must be disposed of or purified after each use. When the salt bath is, for example, $AgCl$, which gives a very high delta-n and depth of diffusion, these counteracting measures can become exceedingly expensive.

The method and composition disclosed herein nas achieved the unexpected result of allowing a substantial portion of a pure monovalent metal salt to be replaced witn a non-monovalent metal salt thereby diminishing the amount of monovalent metal salt required, the volume of the bath, the need for intensive stirring and reducing the expense of tne process while maintaining delta-n and/or depth of diffusion.

Briefly described, a monovalent metal salt, for example $AgCl$, is added to an amount of a non-monovalent metal salt, for example $ZnCl_2$, to yield a mixture. The amounts of each salt in such mixture being sufficient to yield a delta-n substantially equal to that when a pure monovalent salt is used as a bath and/or to yield a depth of diffusion greater than 2.0 mm under similar conditions. The mixture is melted to provide a molten salt batn and the glass is contacted with the bath either before or after becoming molten. The glass is left in the bath for a time sufficient to achieve the desired delta-n and/or depth of diffusion.

It is an object of this invention, therefore, to provide an improved composition and method using the same for producing gradient-index glass having an index gradient substantially equal to that obtained when pure monovalent metal salt is used alone.

It is another object of this invention to provide an improved composition and method using the same for producing gradient-index glass having a depth of diffusion greater than 2.0 mm.

An advantage of this invention is that relatively inexpensive non-monovalent metal salts may be substituted for a substantial amount of an expensive monovalent metal salt in a particular bath.

A feature of this invention is that the ratio of monovalent metal salt to non-monovalent salt is less than 99:1 on a mole basis.

Figure 2:
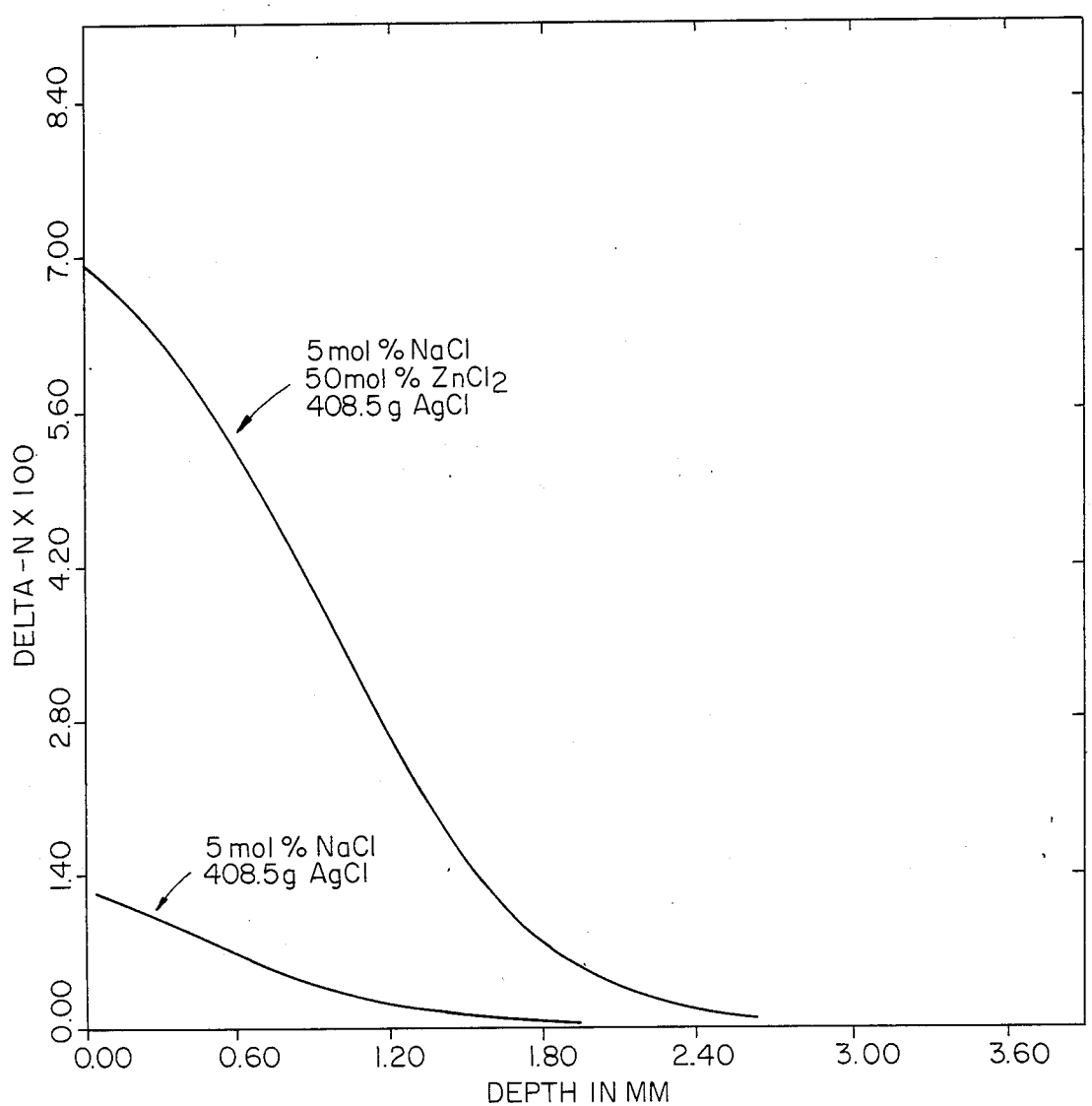

Other objects, advantages and features of this invention, and the best mode now known for the practice thereof, will become more apparent from the following detailed description of the invention which makes reference to the following figures in which:

FIG. 1 is a plot of delta-n as a function of the depth of diffusion for a pure $AgCl$ (408.5 gm) doped with a variable mole-percent of $NaCl$; and FIG. 2 is a plot of delta-n as a function of the deptn of diffusion in mm for a 5% (mole) $NaCl$, 50% (mole) $ZnCl_2$ and 408.5 gm $AgCl$ solution and for a 5% (mole) $NaCl$ and 408.5 gm $AgCl$ solution.

A glass body, typically eitner a planar unit or a cylinder, is selected. The composition of the glass will be one factor determining the maximum delta-n achievable for any one salt bath solution. Typically, glass may be comprised of a silicon dioxide and other metal and alkali oxides. The primary out-diffusing ions in an ion-exchange process are monovalent cations such as sodium. The method and composition disclosed herein, however, are not limited to the use of any particular glass composition.

Prior to initiating the process, the glass body may be polished but polishing is not required. Polishing may improve the maximum delta-n achievable particularly when the bath is not stirred. Polishing may be accomplished by applying compounds of various grit levels to the glass by methods known to those skilled in the art.

Once the glass is prepared, a salt bath is selected which will provide the ions suitable for exchanging with the monovalent cations in the glass. Because of the requirement for electrical neutralilty in glass, the bath must contain a monovalent metal salt (or "diffusant"). AgCl provides one of the best baths presently known for achieving a high delta-n and a substantial depth of diffusion. Other monovalent compounds which yield useful gradient-index profiles and/or depths of diffusion include lithium halides, $LiNO_3$, $KNO_3$, RbCl, $TlSO_4$, $TlNO_3$ and the thallium halides.

To create a high delta-n with a substantial depth of diffusion in a glass body using, for example, pure AgCl, a large container with an essentially unlimited amount of AgCl which is intensively stirred must be used. A research glass, designated BL 2406 with the composition and characteristics as listed in Table 1, of the dimensions 20 mm×20 mm×25 mm was finished with 400 grit on all sides. 400 gm of AgCl (reagent grade) was added to a 250 ml Vycor crucible. The AgCl was heated to approximately 515° C., and the glass was exposed on one planar surface to the molten salt bath for approximately 39.5 hours. The molten salt bath was stirred at 60 rpm during the entire time. Stirring will improve delta-n. Although preferred, stirring is not essential to the claimed method. At the end of the time, the glass was removed from the salt bath to cool. Using a wavelength of 0.5145 μm to measure delta-n, the resulting delta-n was 0.079. The results are presented in Table 2.

TABLE 1

| OXIDE | WT. % |
|---|---|
| $SiO_2$ | 67.0 |
| $Al_2O_3$ | 7.4 |
| $Na_2O$ | 25.6 |
| Transition Temp. | 507° C. |
| Base Index | 1.501 +/− .001 at sodium d line |
| Abbe number | 57.7 |
| Max. delta-n (theoret.) | 0.149 |

Preferrably, the temperature selected should be sufficient to make said salt molten. Preferably, the temperature selected should be at or near the transition temperature of the glass used in order to obtain reasonable diffusion rates without softening the glass. Higher temperatures are desirable where the shape of the glass can be maintained. In addition, the glass also may be added prior to melting and/or left in the bath during cooling.

The poisoning effect that NaCl has on a pure AgCl salt bath may be seen in FIG. 1. In FIG. 1, a 0% NaCl/AgCl solution prepared as described for the above example yields a large delta-n. As the mole percentage of NaCl mixed with AgCl increases, the delta-n obtainable over a given depth of diffusion decreases substantially.

The results achieved for 400 gm of pure AgCl may be compared with other examples in Table 2. Under similar time and temperature conditions, an unstirred bath of only 67 gm of pure AgCl yielded a delta-n of 0.035; however, an unstirred mixture of 54 gm AgCl and 70 gms $PbCl_2$ yielded a delta-n of 0.061. Thus, the delta-n obtainable with pure AgCl can be substantially equaled or bettered by the addition of $PbCl_2$.

TABLE 2

| EXP # | Temp. (°C.) | Melt Comp. (gm) | | Delta-n | Diff. Depth (mm) |
|---|---|---|---|---|---|
| | | AgCl | $PbCl_2$ | | |
| 1 | 513 | 54 | 70 | .061 | 4.7 |
| 2 | 515 | 67 | — | .035 | 2.9 |
| 3 | 515 | 400 | — | .079 | 3.3 |

$PbCl_2$ is a non-monovalent metal salt. It is provided in the bath with AgCl to form a mixture. Since the lead ion is bivalent, it does not exchange with the out-diffusing monovalent cations to any significant degree. It may, however, complex with the out-diffused cations in the bath rendering them unavailable at the glass/bath interface. This prevents a reintroduction of the out-diffused cations into the glass. The net result is that the silver ions remain the primary monovalent ions in the bath available for ion exchange.

Other non-monovalent metal salts useful as additives or "solvents" in this process may be selected from the group consisting of metal halides, sulfates and nitrates. Examples of the metal halides include the metal chlorides. The metal chlorides useful herein may be selected from the group consisting of $ZnCl_2$, $CdCl_2$, $CaCl_2$, $BaCl_2$, $CuCl_2$ and $NdCl_3$.

The effect that the addition of a non-monovalent salt has on NaCl poisoning may be seen in FIG. 2. 5 mole-percent NaCl when added to 408.5 gm of pure AgCl will dimish delta-n in a fashion similar to FIG. 1; however, the addition of a 50 mole-percent of $ZnCl_2$ to this AgCl/NaCl solution will return delta-n to substantially that obtained with pure AgCl.

The following tables provide examples of how this method may be applied to create a gradient-index in a glass structure substantially equal to that obtainable when pure AgCl is used alone or to create a substantial depth of diffusion. The tables also provide compositions of AgCl and bivalent metal chlorides which are useful in the above-described method.

In Table 3, the temperature was selected as approximately 505° C. At that temperature, 130 gm of pure AgCl yields a delta-n of 0.054, while a 1:1 mixture of AgCl to $ZnCl_2$ yields a delta-n of 0.082.

TABLE 3

| EXP # | Temp. (°C.) | Melt Comp. (gm) | | Delta-n | Diff. Depth (mm) |
|---|---|---|---|---|---|
| | | AgCl | $ZnCl_2$ | | |
| 4 | 503 | 76 | 76 | .082 | 2.5 |
| 5 | 505 | 130 | — | .054 | 3.1 |

In Table 4, the temperature was raised to approximately 525° C. For 67 gm of pure AgCl, delta-n was 0.036. A ratio of approximately 1:1 AgCl to $ZnCl_2$ yielded a delta-n of 0.062 (126 gm to 159 gm) to 0.086 (46 gm to 58 gm). This demonstrates that the dominant factor is the ratio of moles of diffusant to solvent. (For the special case of AgCl and $ZnCl_2$, the mole and weight fractions are nearly equal.) The absolute quantity of diffusant is not important unless unreasonably small quantities are used. Where, however, only 18 gm of AgCl was mixed with 82 gm of $ZnCl_2$ the delta-n was substantially the same (i.e., 0.059) as from the bath containing 126 gm AgCl and 159 gm $ZnCl_2$.

TABLE 4

| EXP # | Temp. (°C.) | Melt Comp. (gm) | | Delta-n | Diff. Depth (mm) |
|---|---|---|---|---|---|
| | | AgCl | $ZnCl_2$ | | |
| 6 | 521 | 46 | 58 | .086 | 3.1 |

TABLE 4-continued

| EXP # | Temp. (°C.) | Melt Comp. (gm) AgCl | ZnCl$_2$ | Delta-n | Diff. Depth (mm) |
|---|---|---|---|---|---|
| 7 | 528 | 67 | — | .036 | 3.6 |
| 8 | 521 | 18 | 82 | .059 | 2.8 |
| 9 | 520 | 126 | 159 | .062 | 3.9 |

Finally, in Table 5, the temperature was raised to approximately 535° C. 140 gm of pure AgCl yielded a delta-n of 0.063. A ratio of 1:1 AgCl to ZnCl$_2$ (35 gm to 35 gm) yielded a delta-n substantially equal to that of a large, pure AgCl bath (i.e., 0.076 vis. 0.063).

TABLE 5

| EXP # | Temp. (°C.) | Melt Comp. (gm) AgCl | ZnCl$_2$ | Delta-n | Diff. Depth (mm) |
|---|---|---|---|---|---|
| 10 | 532 | 35 | 35 | .076 | 5.1 |
| 11 | 539 | 140 | — | .063 | 4.0 |
| 12 | 538 | 67 | — | .042 | 3.2 |

The above method and composition also may be applied to field-assisted ion exchange. The above method and compositions may be used as described above; however, the glass should be configured such that separate baths may be used. A box configuration provides an example wherein the salt baths selected are applied both outside and within the box. Electrodes then are placed in the baths, one inside and one outside the box. A voltage then is applied across the box to yield a gradient-index glass with the desired profile and/or depth of diffusion.

Variations and modifications in the above-described process will suggest themselves to those skilled in the art. Accordingly, the foregoing description is illustrative and should not be taken in a limiting sense.

We claim:

1. An ion exchange method for producing a gradient-index profile in a glass body providing monovalent outdiffusing cations, which method comprises the steps of combining an amount of monovalent metal salt which provides silver monovalent cations other than the outdiffusing cations which are exchanged with the monovalent cations of the glass with an amount of metal salt containing non-monovalent cations which do not exchange with the outdiffusing cations and which will complex therewith in a container to form a mixture, said amounts of salt in said mixture being sufficient to yield a delta-n substantially equal to a delta-n obtained when an amount of pure salt containing monovalent cations is used alone and/or being sufficient to yield a substantial depth of diffusion while counteracting poisoning of the mixture by the outdiffusing cations, thereby enabling a large reduction in the amount of the monovalent metal salt employed for obtaining an equivalent delta-n, heating said mixture until said mixture is molten to provide a salt bath of said mixture, and contacting said glass with said salt bath for a time sufficient to obtain ion exchange between said monovalent cations of said glass and of said metal salt containing monovalent outdiffusing cations and yield said gradient-index profile and/or depth of diffusion.

2. The method according to claim 1 wherein said outdiffusing cation is sodium.

3. The method according to claim 1 wherein said salt is AgCl.

4. The method according to claim 1 wherein said non-monovalent metal salt is selected from the group consisting of halides, sulfates and nitrates.

5. The method according to claim 4 wherein said halides are chlorides selected from the group consisting of ZnCl$_2$, PbCl$_2$, CdCl$_2$, CaCl$_2$, BaCl$_2$, CuCl$_2$ and NdCl$_3$.

6. The method according to claim 5 wherein said chloride is ZnCl$_2$.

7. The method according to claim 5 wherein said chloride is PbCl$_2$.

8. The method according to claim 1 wherein said amount of non-monovalent metal salt added to said amount of non-monovalent salt yields a ratio of less than 99:1 monovalent salt to non-monovalent metal salt on a mole basis.

9. The method according to claim 8 wherein the ratio is approximately 1:1.

10. The method according to claim 1 wherein a voltage is applied across said glass once the mixture is heated.

11. The method according to claim 1 wherein said non-monovalent salt is halide salt.

12. An ion exchange method for producing a gradient-index profile in a glass body which provides monovalent non-Ag outdiffusing cations, which method comprises the steps of placing an amount of AgCl which provides monovalent Ag cations for exchange with the outdiffusing cations in a container, adding an amount of bivalent metal chloride which does not exchange with the outdiffusing cations and which will complex therewith to said container to form a mixture, said amounts of AgCl and bivalent metal chloride being sufficient to yield a delta-n substantially equal to a delta-n obtained when an amount of pure AgCl is used alone and/or being sufficient to yield a depth of diffusion greater than 2.0 mm while said amount of bivalent metal chloride in said mixture is sufficient to counteract poisoning by said outdiffusing cations, heating said mixture until molten to provide a bath, contacting said glass with said bath for a time sufficient to obtain exchange between said outdiffusing cations from said glass and said Ag cations to achieve the desired delta-n and/or depth of diffusion.

13. The method according to claim 12 wherein the ratio of AgCl to bivalent metal chloride is less than 99:1.

14. The method according to claim 13 wherein the mole ratio of AgCl to bivalent metal chloride is approximately 1:1.

15. The method according to claim 12 wherein said mixture is heated to at or near the transition point of said glass.

16. The method according to claim 12 wherein the delta-n obtained with said mixture is greater than 0.02.

17. The method according to claim 12 wherein said bivalent metal chloride is selected from the group consisting of ZnCl$_2$, PbCl$_2$, CdCl$_2$, CaCl$_2$, BaCl$_2$ and NdCl$_3$.

18. The method according to claim 17 wherein said chloride is ZnCl$_2$.

19. The method according to claim 17 wherein said chloride is PbCl$_2$.

20. The method according to claim 12 wherein voltage is applied across said glass once the mixture is heated.

* * * * *